United States Patent [19]

Chang

[11] Patent Number: 5,694,825
[45] Date of Patent: Dec. 9, 1997

[54] BLADE ADJUSTING DEVICE FOR A SCROLL SAW

[76] Inventor: Chin-Chin Chang, No.122, Lane 967, San Feng Road, Feng Yuan, Taichung Hsien, Taiwan

[21] Appl. No.: 744,973

[22] Filed: Nov. 7, 1996

[51] Int. Cl.⁶ .................................................. B27B 19/02
[52] U.S. Cl. ................................ 83/581.1; 83/662; 83/783
[58] Field of Search ................................. 83/581.1, 662, 83/699.31, 783, 784, 699.21

[56] References Cited

U.S. PATENT DOCUMENTS

| | | | |
|---|---|---|---|
| 4,616,541 | 10/1986 | Eccardt et al. | 83/662 |
| 4,724,735 | 2/1988 | Rice | 83/581.1 |
| 5,016,512 | 5/1991 | Huang | 83/581.1 |
| 5,058,476 | 10/1991 | Legler et al. | 83/581.1 |
| 5,088,369 | 2/1992 | Rice et al. | 83/581.1 |
| 5,105,704 | 4/1992 | Chang | 83/662 |
| 5,228,376 | 7/1993 | Huang | 83/662 |

FOREIGN PATENT DOCUMENTS

| | | | |
|---|---|---|---|
| 478503 | 6/1929 | Germany | 83/783 |

*Primary Examiner*—Maurina Rachuba
*Attorney, Agent, or Firm*—Connolly & Hutz

[57] ABSTRACT

A blade adjusting device for a scroll saw, using engaging projections on the lower side of a press knob, engaging with projecting or receding parts on the upper side of a catch seat, to transform turning the press knob into an up-and-down movement of the catch seat, thus lengthening or shortening the distance between an upper and a lower protruding arm that hold the blade of the saw, so as to easily mount and dismount the blade and to adjust the tenseness of the blade.

4 Claims, 5 Drawing Sheets

BLADE ADJUSTING DEVICE FOR A SCROLL SAW

BACKGROUND OF THE INVENTION

1. Field of the Invention

The present invention relates to an improvement of the blade adjusting device of a scroll saw, particularly to changing the rotating movement of a press knob into an axial movement to couple and decouple the press knob and a catch seat, in order to adjust and to mount or dismount the blade and fix the position of the upper and lower protruding arm.

2. Description of Related Art

Scroll saws are widely used in the industry, because they are easy to handle and handy for cutting and working. A blade adjusting device has been disclosed in U.S. Pat. No. 4,724,735 and No. 5,088,369. Therein, for mounting and dismounting the blade as well as for adjusting the tenseness of the blade the distance between the upper and lower protruding arms that hold the blade can be adjusted. If the blade is too loose, it will not cut. If it is too tight, it breaks easily. Since the blade of a scroll saw at cutting time is held by the two protruding arms, which in turn are held only by a threaded shaft, and since there is no additional element, the vibrations of a rapidly moving blade cause the upper and lower protruding arm to change their mutual distance, and the blade will loosen, hampering the cutting effect.

SUMMARY OF THE INVENTION

It is therefore the main object of the present invention to provide a blade adjusting device for a scroll saw, which allows for a quick exchange of the blade and which maintains the tenseness of the blade during operation. The blade adjusting device of the present invention uses a catch seat with a projecting part on its upper end and a knob having a projecting part engaging therewith. Thereby a rotating movement of the knob is transformed into an axial movement, and the blade can be changed quickly, Furthermore, the blade adjusting device of the present invention has a pressing and pulling effect, maintaining the distance between the upper and lower protruding arm when the saw moves rapidly.

The present invention can be more fully understood by reference to the following description and accompanying drawings.

DETAILED DESCRIPTION OF THE PREFERRED EMBODIMENT

Figure 1:
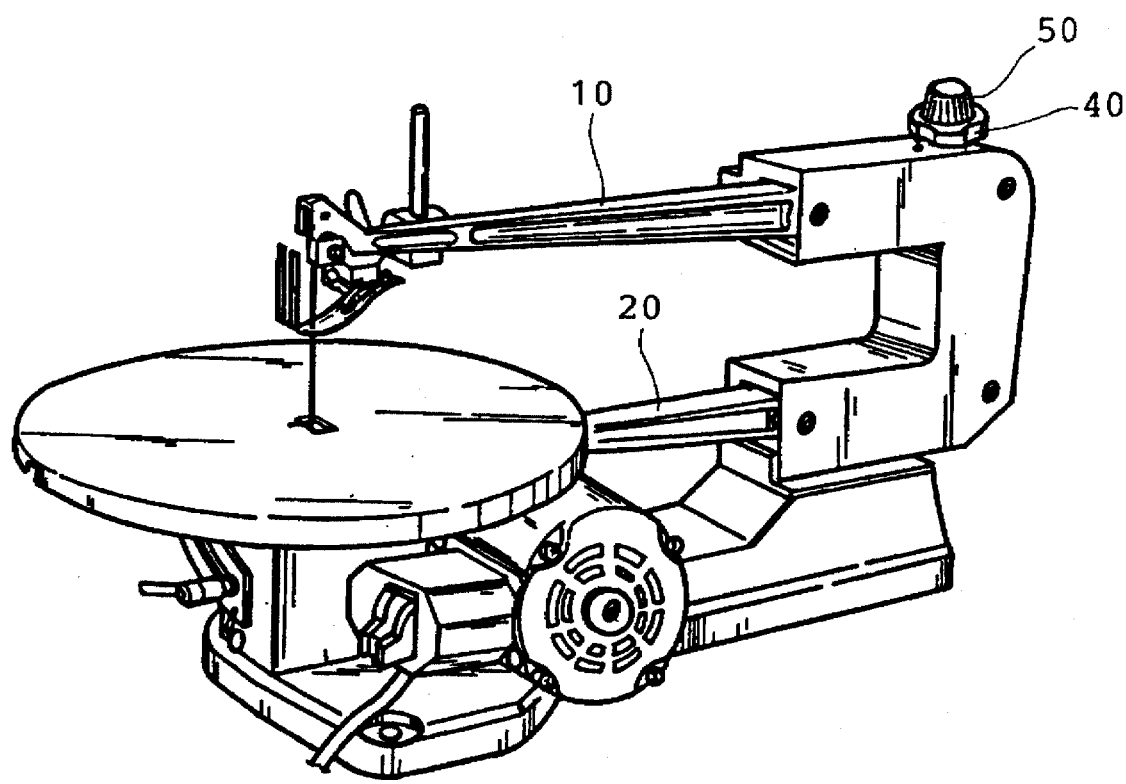
FIG. 1 is a perspective whole view of the scroll saw used by the present invention.
Figure 2:
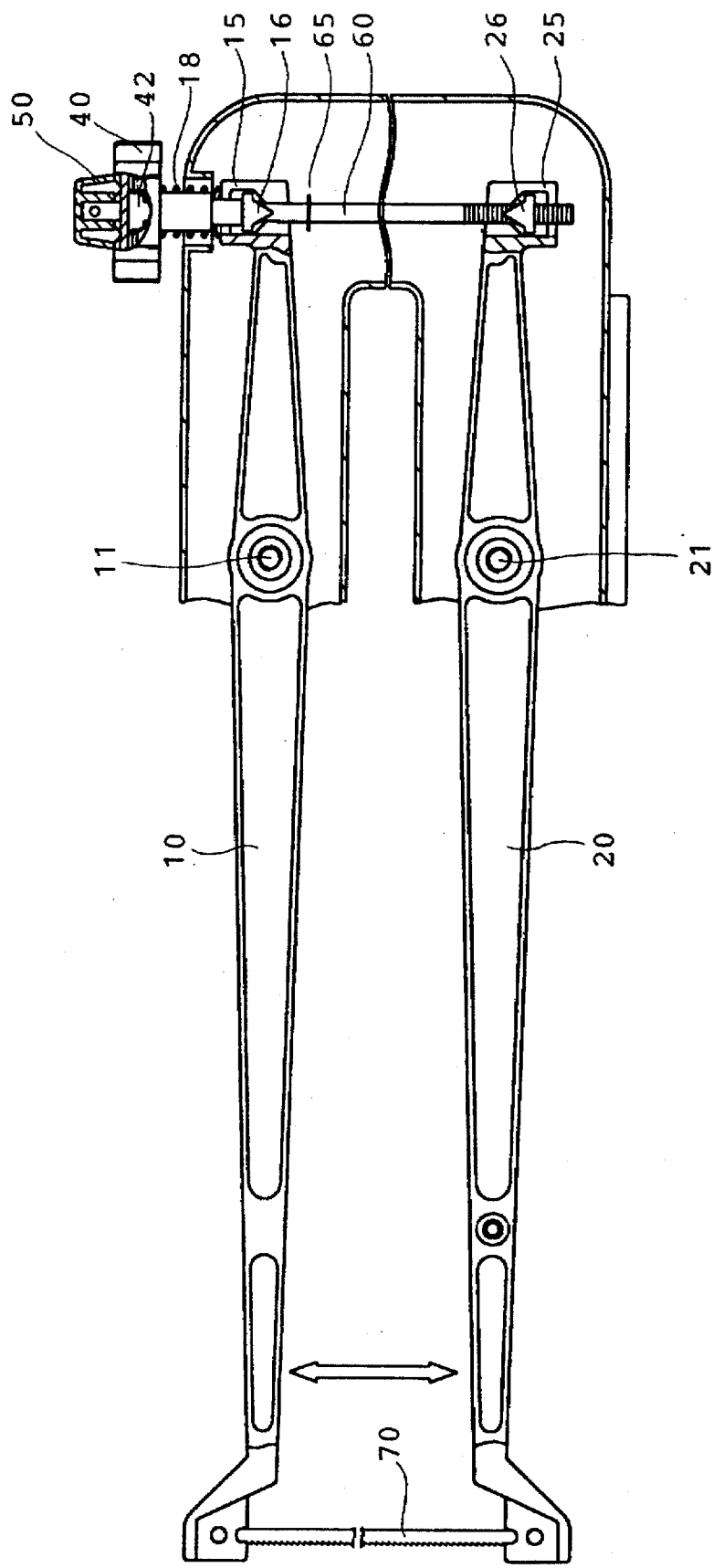
FIG. 2 is a side view, partly in section, of the adjusting device and the upper and lower protruding arm of the present invention.
Figure 3:
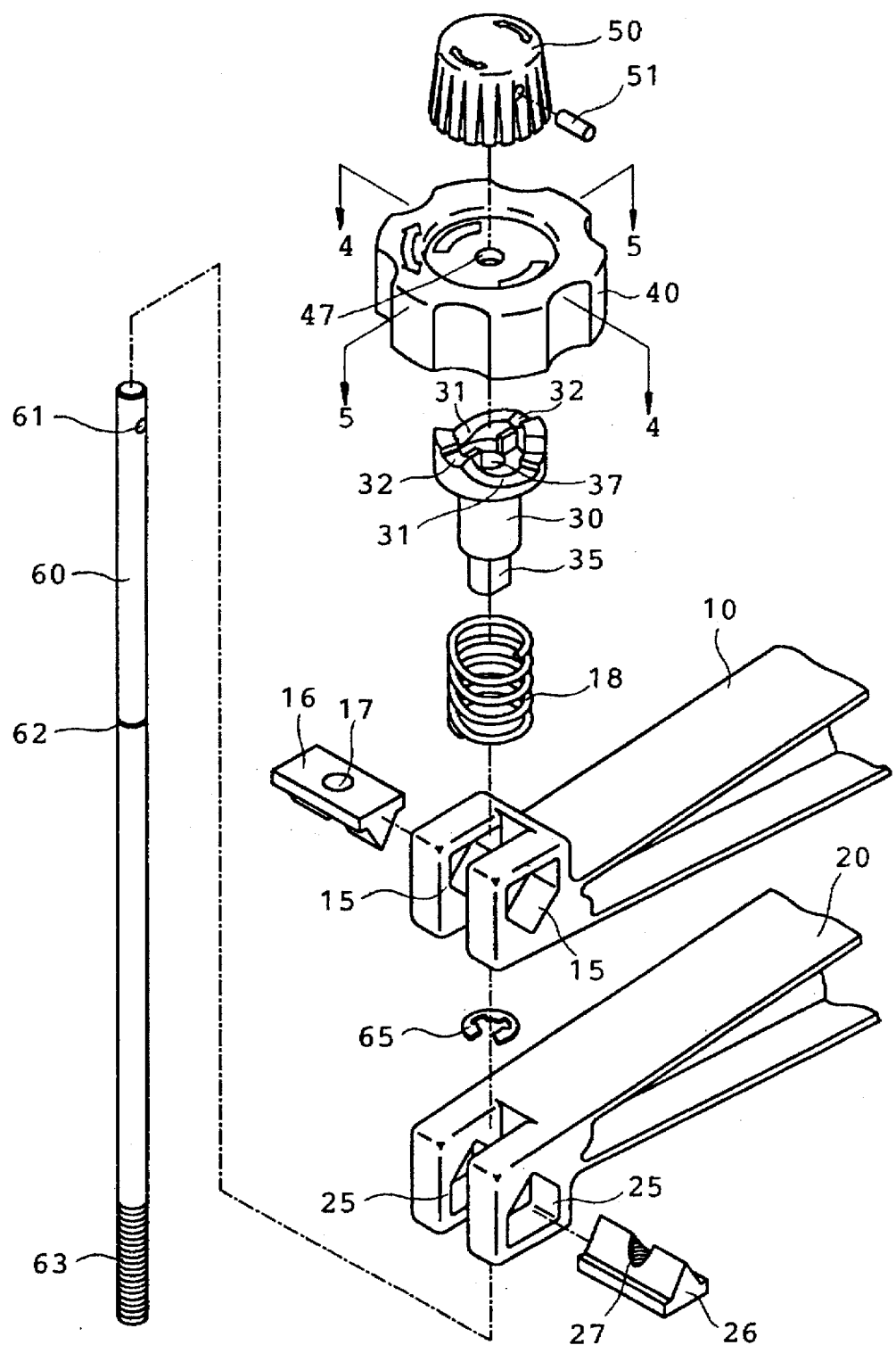
FIG. 3 is an exploded perspective view of the adjusting device of the present invention.

Referring to FIGS. 1 to 3, the adjusting device of the present invention comprises an upper protruding arm 10, a lower protruding arm 20, a catch seat 30, a press knob 40, an adjusting knob 50, and an adjusting shaft 60. The upper and the lower protruding arms 10, 20 are symmetric and are each hingedly mounted on pivots 11 and 21, respectively, and thus connected to a casing. To the front ends of the upper and the lower protruding arms 10, 20 the blade 70 is attached. The back end of the upper protruding arm 10 has a pair of aligned pentagon-shaped openings 15. Similarly, the back end of the lower protruding arm 20 has a pair of aligned pentagon-shaped openings 25. The pentagon-shaped openings 15 and 25 accommodate an upper plug blocker 16 and a lower plug blocker 26, respectively, which are inserted horizontically and determine the postion of the back ends of the upper and the lower protruding arms 10, 20. The plug blockers 16, 26 are shaped like prisms, with the crests pointing to each other. The upper plug blocker has a vertical through hole 17, and the lower plug blocker has a vertical threaded through hole 27. The adjusting shaft 60 passes through holes 17 and 27.

The catch seat 30 is formed as a hollow cylinder with a vertical axis and a widened upper end. The catch seat 30 works as a blocking part. The top side is formed as a cam contour with vertically protruding parts 32 and receding parts 31, which are symmetrically arranged. The catch seat 30 passes through a helical spring 18. The lower end of the catch seat 30 has two flattened surfaces 35 opposite to each other. It passes through the upper protruding arm 10 at the back end thereof between the pentagon-shaped openings 15, with the flattened surfaces 35 being in contact with the upper protruding arm 10. Thus a rotation of the catch seat around its axis is prevented. The adjusting shaft 60 passes through the catch seat 30 along axis thereof.

Figure 4:
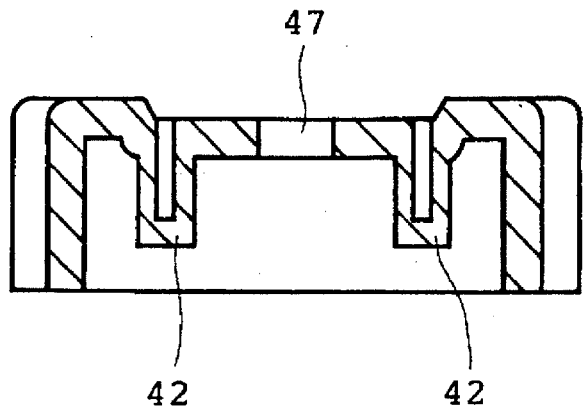
FIG. 4 is a sectional view of the knob in the adjusting device of the present invention of FIG. 3, taken along the line 4—4.
Figure 5:
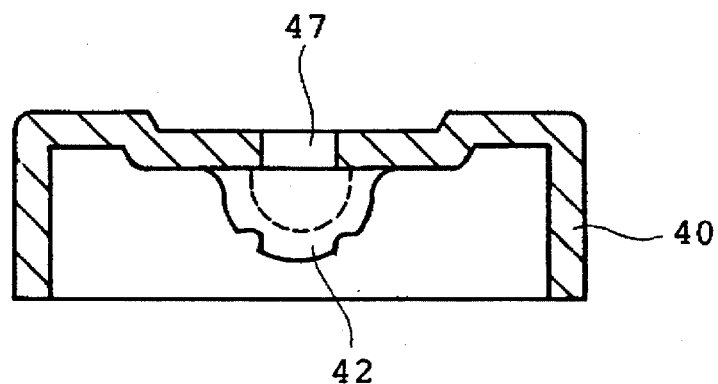
FIG. 5 is a sectional view of the knob in the adjusting device of the present invention of FIG. 3, taken along the line 5—5.

The press knob 40 has a through hole 47 at its axis. The through hole 47 is passed through by the adjusting shaft 60. So the axis of the press knob and the axis of the catch seat 30 are the same. On the lower end, the press knob 40 is provided with symmetrically arranged engaging projections 42, as shown in FIGS. 4 and 5. The engaging projections 40 are in contact with the cam contour on the upper end of the catch seat 30. So, when the press knob 40 is turned, the engaging projections 40 glide along the cam contour, touching the protruding parts 32 and the receding parts 31. Turning the press knob 40 is transformed into an axial up-and-down movement of the catch seat 30, which lets the press knob 40 and the catch seat 30 move against each other, leading in turn to a lengthening or shortening of the distance of the upper and lower protruding arm 10 and 20. Thereby the blade 70 can be mounted and dismounted fast and effectively.

The adjusting knob 50 is fixed to the adjusting shaft 60 by a locking pin 51, which passes through a horizontal hole 61 near the upper end of the adjusting shaft 60. The adjusting knob 50 is freely rotatable against the press knob 40 and serves to adjust the tenseness of the blade 70.

The adjusting shaft 60 passes through all elements. On its lower end it has a thread 63, which engages with the threaded hole 27 of the lower plug block 26. Thereby turning the adjusting shaft 60 adjusts the distance between the back ends of the upper and lower protruding arm 10 and 20. Furthermore, the adjusting shaft is provided with a peripheral groove 62 in the middle, which engages with a retainer 65. When the distance between the back ends of the upper and lower protruding arm 10 and 20 is adjusted by turning the adjusting shaft 60, a limit is set to turning the adjusting shaft 60, thereby avoiding the loosening of the adjusting shaft 60 on the lower plug block 26.

Figure 6:
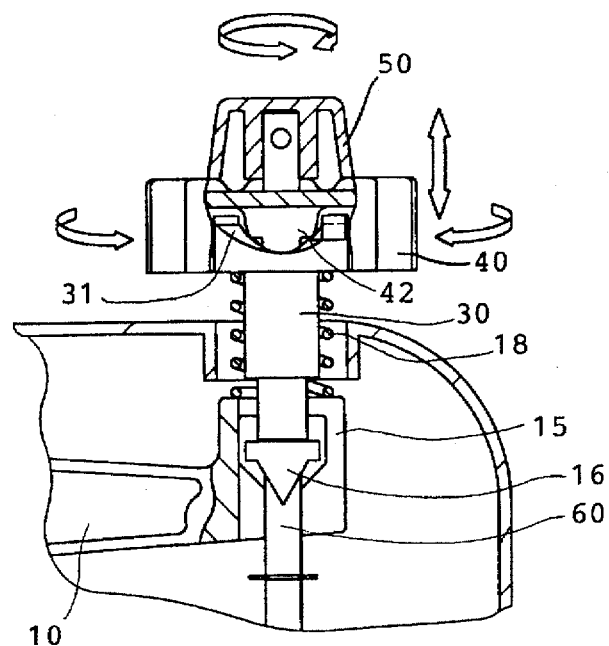
FIG. 6 is a schematic illustration of the movement of the adjusting device of the present invention (first state).
Figure 7:
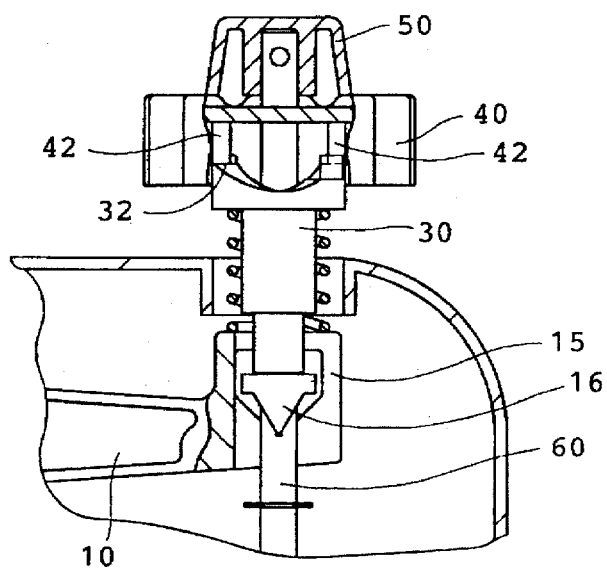
FIG. 7 is a schematic illustration of the movement of the adjusting device of the present invention (second state).

The operation of the adjusting device is shown in FIGS. 6 and 7. In order to mount or dismount the blade 70, the user turns the press knob 40 in a loosening position, wherein the engaging projections 42 of the press knob 40 are in contact with the receding parts 31 of the catch seat 30. Then the press knob 40 and the catch seat 30 are not pressed against each other, allowing for the adjusting knob 50 to be turned easily and, by way of the adjusting shaft 60 turning along therewith, to adjust the distance between the ends of the upper and lower protruding arm 10 and 20, such that the blade 70 may be mounted or dismounted. After changing in the desired blade 70, the user, by turning the adjusting knob 50 and with it the adjusting shaft 60, shortens the distance between the back ends of the upper and lower protruding arm 10 and 20, thereby enlarging the distance between the front ends thereof and making the blade 70 tense.

When the user turns the press knob 40 in a tightening position, wherein the engaging projections 42 of the press knob 40 are in contact with the projecting parts 32 of the catch seat 30, then the press knob 40 and the catch seat 30 are pressed against each other, and the blade adjusting system is held in its position by pressure. Thus, if the blade moves violently during cutting, the upper and lower protruding arm 10 and 20 are kept in their relative position, and a loosening of the blade, as in a conventional system, is prevented.

What is claimed is:

1. A blade adjusting device for a scroll saw, comprising:

an upper protruding arm, having a front end and a back end and having a pair of aligned upper pentagon-shaped openings on said back end with a space between said upper pentagon-shaped openings;

a lower protruding arm, having a front end and a back end, said upper and lower protruding arms being symmetrical to each other, said lower protruding arm having a pair of aligned lower pentagon-shaped openings on said back ends with a space between said lower pentagon-shaped openings, said upper and lower pairs of pentagon-shaped openings lying in common planes and accommodating an upper and a lower plug blocker, respectively, said upper and lower plug blockers each being prism-shaped and being provided with a through hole, said through holes being aligned, said through hole of said lower plug blocker having a thread;

an adjusting shaft, passing through said through holes, having a thread that engages with said thread of said lower plug blocker;

a catch seat, which is roughly formed as a hollow cylinder with an upper end and a lower end, said upper end having a plurality of upward protruding parts regularly distributed around said upper end, with a receding part between each pair of neighboring protruding parts, said catch seat passing through a helical spring, said catch seat near said lower end thereof being inserted in said space between said upper pentagon-shaped openings, said lower end having two flattened surfaces that are parallel to each other and contact said upper protruding arm;

a press knob with an upper and a lower side, having a hole in the middle thereof, sharing a common axis with said catch seat, being passed through by said adjusting shaft, said lower side of said press knob having two symmetrical engaging projections; and an adjusting knob, having a hole in the middle thereof, sharing a common axis with said catch seat, being passed through by said adjusting shaft, and being rotatable against said press knob;

wherein said two engaging projections of said press knob contact said protruding parts and said receding parts of said catch seat, such that turning said press knob causes an axial reciprocating movement of said catch seat, and wherein turning said adjusting knob causes said adjusting shaft to rotate, adjusting the distance between said back ends of said upper and lower protruding arms.

2. A blade adjusting device for a scroll saw according to claim 1, wherein said upper and lower protruding arm are hingedly mounted on a casing and a blade is fixed to said front ends of said upper and lower protruding arm.

3. A blade adjusting device for a scroll saw according to claim 1, wherein said two engaging projections of said press knob glide over said protruding parts of said catch seat, pushing thereon, and over said receding parts of said catch seat, such that turning said press knob causes an axial reciprocating movement of said catch seat.

4. A blade adjusting device for a scroll saw according to claim 1, wherein said adjusting shaft is provided with a peripheral groove, in the middle, which engages with a retainer.

* * * * *